United States Patent [19]

Coles et al.

[11] 4,257,280
[45] Mar. 24, 1981

[54] GYROSCOPES

[75] Inventors: Peter H. Coles, Reading; Geoffrey C. Downton, Wokingham, both of England

[73] Assignee: Sperry Limited, Berkshire, England

[21] Appl. No.: 73,823

[22] Filed: Sep. 10, 1979

[30] Foreign Application Priority Data

Sep. 20, 1978 [GB] United Kingdom ............... 37409/78

[51] Int. Cl.³ ............................................. G01C 19/08
[52] U.S. Cl. ........................................ 74/5.6 E; 74/5.7
[58] Field of Search ...................... 74/5.47, 5.7, 5.6 E; 318/701, 703, 712, 717

[56] References Cited

U.S. PATENT DOCUMENTS

| 2,719,291 | 9/1955 | Wing | 340/345 |
| 3,238,432 | 3/1966 | Amberger | 74/5.7 |
| 3,288,923 | 11/1966 | Arimura et al. | 318/717 X |
| 3,702,569 | 11/1972 | Quinn et al. | 74/5.7 X |

FOREIGN PATENT DOCUMENTS 1304571 1/1973 United Kingdom .
1364757 8/1974 United Kingdom .

Primary Examiner—Rodney H. Bonck
Attorney, Agent, or Firm—Howard P. Terry

[57] ABSTRACT

The invention provides a gyroscope employing a sensitive element rotated by a hysteresis motor and which has an improved bias repeatability, the bias arising from vibration of the sensitive element imparted thereto by the hysteresis motor. An identifiable point associated with the sensitive element (9) is sensed by first sensor means (37, 38, 67, 71) and a pole vector associated with the hysteresis motor (6) is sensed directly or indirectly by second sensor means (64), the outputs of these sensor means being applied to comparator means (73) which is operable to compare the phase of the pole vector ($V_p$) with respect to the identifiable point. Control means (76, 79) are also provided which are responsive to the output of the comparator means (73) and operable to adjust the phase of the pole vector ($V_p$) with respect to the identifiable point to a required relationship, the gyroscope further comprising means (73), for maintaining that required relationship once established.

The invention is particularly applicable to flexure-suspended free-rotor gyroscopes.

7 Claims, 8 Drawing Figures

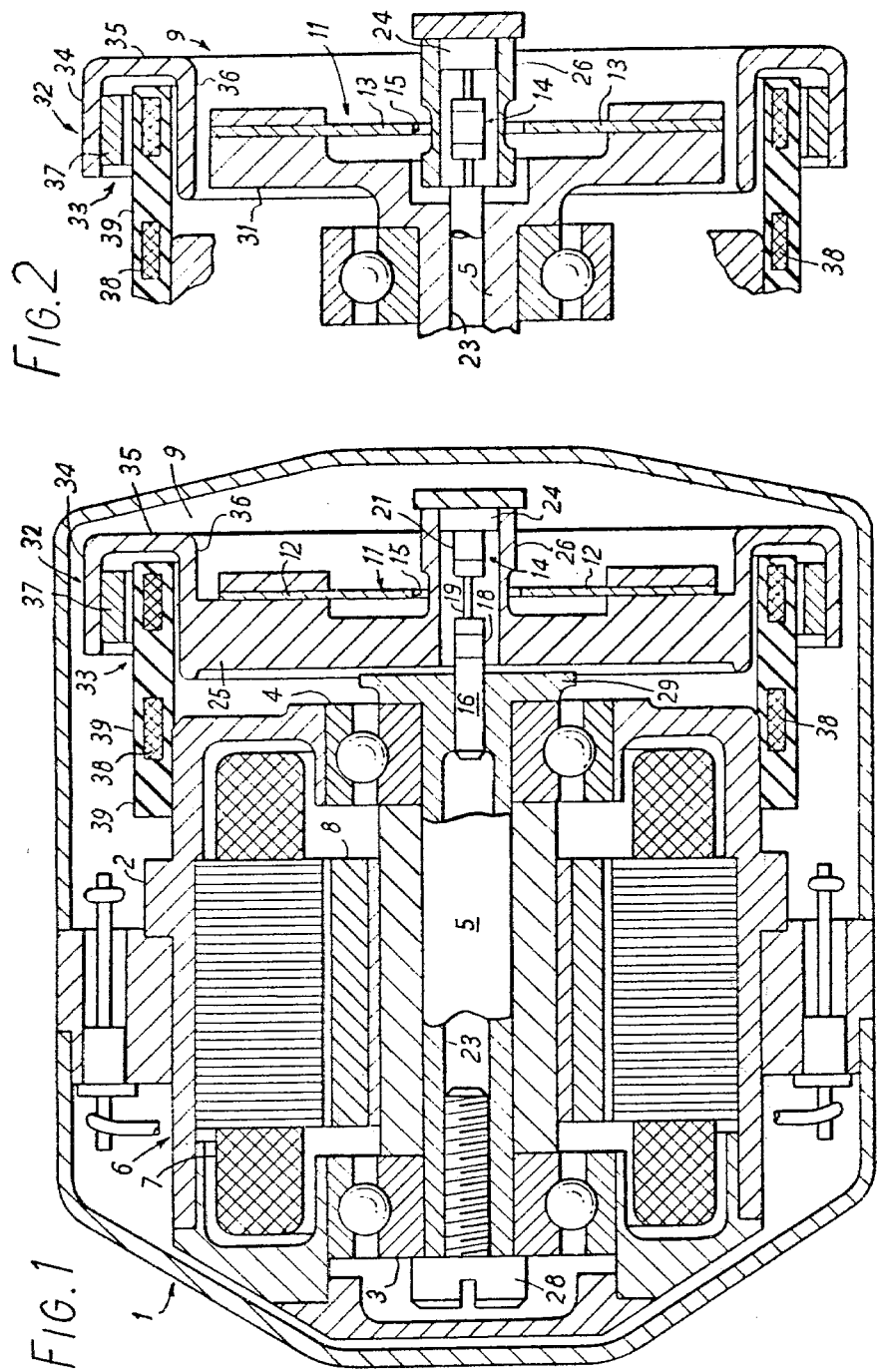

GYROSCOPES

BACKGROUND OF THE INVENTION

1. Field of the Invention

This invention relates to gyroscopes in general although, for convenience, will in the main be discussed in relation to flexure-suspended, free-rotor gyroscopes since the invention is particularly applicable thereto.

2. Description of the Prior Art

A gyroscope having a sensitive element attached to a rotor of a hysteresis or synchronous motor suffers from a problem in that the hysteresis motor gives rise to vibration of the sensitive element with the result that a bias drift is introduced into the gyroscope, thereby degrading its performance. In the case of a four-pole hysteresis motor, stator coils thereof are arranged around the circumference of the rotor and are energised by sine and cosine waveforms which generate a pole or flux vector ($V_p$) around the rotor circumference which rotates at half the frequency of the sine and cosine waveforms. Energisation of the stator coils causes a rotating magnetomotive force to accelerate the motor up to full speed. During normal running the angular relationship ($\phi$) between an arbitrary vector $\vec{AB}$ fixed in the motor body and the axis of the rotating magnetising field $\vec{MN}$ is nominally constant. De-energising the stator coils momentarily whilst the rotor is spinning causes the rotating magnetising field vector $\vec{MN}$ to re-form at a different angle $\phi$ to $\vec{AB}$.

Inevitable manufacturing and assembly tolerancies associated with hystereses motors mean that the air gap between the rotor and stator is not entirely uniform, hence there is likely to be a point on the the stator ring that is closer to the motor spin axis than any other point on the ring. If a diameter CD is drawn through this point, it will always nominally be fixed with respect to the stator windings.

The rotor, being made of magnetic material, is subject to the forces of magnetic attraction and nowhere is this attractive force so great as when the magnetising field parallel to $\vec{MN}$ bridges this point of smallest air gap, i.e. when $\vec{MN}$ is parallel to CD. This attractive force is along CD and occurs twice per rotor revolution and always in the same direction with respect to the stator. An observer fixed to the stator at the point of smallest air gap measuring both the attractive force and the magnetising field would see a sinusoidal magnetising field and a fluctuating or pulsating unidirectional attractive force. This attractive force sets up vibrations which cause the gyroscope to drift. The points on the rotor at which the maximum force is experienced can be indicated by the intersection of $\vec{MN}$ with the rotor circumference. These points, together with the rotor spin axis, define a plane along which the maximum amplitude pulsations occur and changing the angular relationship $\phi$ shifts the points, and hence the plane of vibration, which is sufficient to change the value and direction of the bias drift of the gyroscope. Thus the value of bias drift varies from switch-on to switch-on of the gyroscope. It is this lack of bias drift repeatability which is the problem because if the drift were constant, then the necessary correction can be made during calibration.

This change in bias drift, which can be of the order of several degrees per hour, introduced by the hysteresis motor is unacceptable in any high quality gyroscope but is particularly problematical in a flexure-suspended, free-rotor gyroscope such as disclosed, for example, in British Pat. Nos. 1,304,571 and 1,364,757.

There are some known methods of alleviating the identified problem one of which is to employ a servo loop in the gyroscope drive which ensures that the rotational speed of the rotor is slightly different from that which would pertain if the rotor were in synchronism with the rotating vector $\vec{MN}$. This method is effective in overcoming the problem but consumes a relatively large amount of power which can be critical in some applications. Another known method is to change the phase of the stator energising signals, by interrupting the signals, so as to change sequentially the direction of the axes of the permanent magnets formed in the rotor and hence the direction of the bias drift. In this way, the bias drift is averaged out. Again this method is effective in meeting the problem concerned but it has now been realised that it is the cause of another problem. Every time the stator energising signals are phase slipped, torque transients are introduced into the rotor which in turn causes a drift in the output signal of the gyroscope.

It is the object of the present invention to overcome the problem of changes in bias drift introduced by the hysteresis motor without degrading the performance of the gyroscope in other respects and without incurring excessive power consumption.

SUMMARY OF THE INVENTION

According to the present invention a gyroscope comprises a rotatable sensitive element, a hysteresis motor having a rotor drivingly connected to the sensitive element, first sensor means operable to sense the position of an identifiable point associated with the sensitive element and produce an output signal, second sensor means operable to produce an output signal representative of a pole vector associated with the hysteresis motor, comparator means responsive to the output signals from the first and second sensor means and operable to compare the phase of the pole vector with respect to the identifiable point and produce an output signal, control means responsive to the output signal of the comparator means and operable to adjust the phase of the pole vector relative to said identifiable point to a required relationship, and means for maintaining said required relationship when the latter has been established.

The first sensor means may be electromagnetic and may comprise a magnetic element inserted into the sensitive element of the gyroscope, the magnetic element thus providing the identifiable point and being sensed by coil means as the sensitive element rotates. In one embodiment of the invention involving a flexure-suspended, free-rotor gyroscope, the sensitive element of the gyroscope has a plurality of permanent magnets established in the periphery of the sensitive element which are used, in conjunction with coil means, to sense displacement of the sensitive element. It is found that these permanent magnets give the sensitive element a unique signature due to assembly and manufacturing tolerances. As the sensitive element rotates, a sinusoidal signal is induced into the coil means and the phase of this signal with respect to the sensitive element is fixed so that any point on the waveform relates to a specific point on the sensitive element. Thus the identifiable point can be made any desired point on the waveform and the first sensor means made to detect this point. For example, the identifiable point may be the positive-going crossover point of the waveform which is detected by a crossover detector forming part of the first sensor means, the detector providing a pulse output signal. The second sensing means may also comprise a crossover detector producing a pulse output signal and the comparator means may then compare the incidence of one pulse signal with the other. If the pulses are not coincident, the output signal from the comparator means is such as to cause the control means to slow the rotation of the sensitive element and this may be achieved by interrupting the drive signal to the hysteresis motor. When the pulses from the first and second sensor means are coincident, the means for maintaining said required relationship may lock the phase of the pole vector with respect to the identifiable point and thereafter the hysteresis motor is driven by an uninterrupted source.

With this arrangement, the magnitude and direction of the bias drift of the gyroscope due to the vibration set up by the hysteresis motor is held within close tolerances so that the bias can be compensated during manufacture. Furthermore, the bias drift repeatability is achieved during a relatively short period after run-up of the gyroscope so that the performance of the latter is not degraded once the desired relationship between the identifiable point and the selected pole vector has been obtained and maintained.

BRIEF DESCRIPTION OF THE DRAWINGS

A gyroscope in accordance with the present invention will now be described in greater detail, by way of example, with reference to the accompanying drawings, in which:

FIG. 1 is an elevational view of the gyroscope in cross section,

FIG. 2 is a fragmentary cross-sectional view taken at ninety degrees to the section of FIG. 1.

DESCRIPTION OF THE PREFERRED EMBODIMENT

Figure 3:
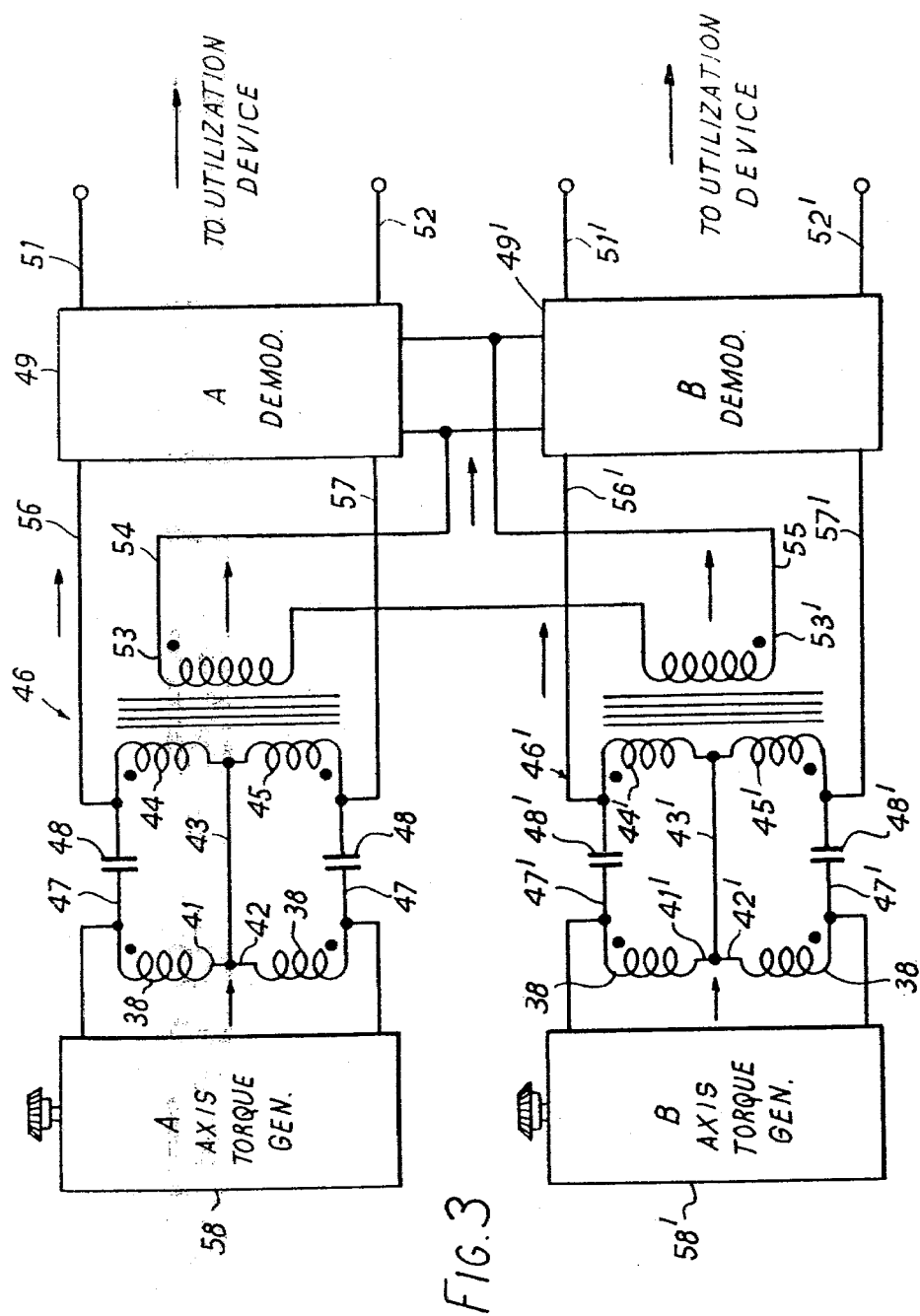
FIG. 3 is a circuit diagram relating to the basic operation of the gyroscope.

Referring to FIGS. 1 and 2, the gyroscope is indicated at 1 and comprises a housing 2 within which are mounted anti-friction bearings 3 and 4 which journal a hollow drive shaft 5 about its geometrical spin axis. The drive shaft 5 is rotated by a generally conventional hysteresis or synchronous spin motor 6 having a stator 7 and a rotor 8. The gyroscope has a sensitive element in the form of a wheel 9 radially suspended by a flexure support spider 11 having four equiangularly disposed resilient, thin, flat arms 12,12, 13,13 which flexibly support the wheel 9 for rotation about the normal spin axis. The wheel 9 is supported in the spin axis direction by a further flexure support or strut 14 extending through an aperture 15 in the spider 11. The flexure support 14 has a cylindrical extension 16 received by the hollow shaft 5, whereby it is affixed within the latter.

The flexure support 14 consists of a machined cylindrical rod having three flat flexure elements 18, 19 and 21 milled in its active flexure region. The cylindrical portion 16 of the rod is affixed within the shaft 5 in the central bore 23, while its opposite cylindrical portion 24 is fixed to a spoke 25 (FIG. 1) of the gyroscope wheel 9 through a tubular projection 26. The end flexures 18 and 21 lie in the same diametral plane of the support 14, a plane perpendicular to the diametral plane of the intermediate flexure 19. The flexure element 19 is preferably twice as long as either of the equal length end flexure elements 18 and 21.

The suspension system for the gyroscope wheel 9 provides translational rigidity along three mutually perpendicular axes and a low torsional restraint in a simple, low cost configuration having an inherently low sensitivity to twice-rotor-speed vibration. The use of the series of three flat flexure elements 18, 19 and 21 results in a desirable and significant reduction in the flexural rigidity of the support 14. The use of the three flat flexure elements 18, 19 and 21 also advantageously keeps the centre of flexing constant, no matter what the direction of deflection of the gyroscope wheel 9. The intermediate flat flexure element 19 is centred in the aperture 15 in the spider 11.

In operation, all radial and drive motor torque loads on the rotating system are carried by the spider 11 which accommodates tilt of the gyroscope wheel 9 with respect to the drive shaft 5 by twisting deflection of its crossed arms 12, 13. In fact, the central part of the spider 11 may be likened to the intermediate gimbal of a Hooke's universal joint. Because this effective gimbal is formed from extremely thin metal sheet, it is inherently mass-balanced with respect to the two mutually perpendicular pivot axes and the gyroscope thus has a low inherent sensitivity to twice-rotor-speed vibration.

In operation, all axial loads on the rotating system are carried by the triple flexure support 14. As previously noted, the support 14 is proportioned with the flat intermediate flexure element 19 twice as long as each of the two flat and flexure elements 18 and 21. Such a configuration has equal flexural stiffness in any deflection direction, as well as equal columnar strength. Although the axial support of the effective central gimbal portion of the radial suspension is soft, the extremely low mass of the effective gimbal prevents an excessive anisoelastic acceleration sensitivity.

It is seen that the axially disposed triple flexure support 14 is affixed at one end through the tube 26 to the spoke 25, and fixed at its opposite end in the bore 23 in the hollow drive shaft 5. The opposite end of the hollow shaft 5 is provided with a screw 28 mating with a thread internally of the hollow shaft 5. The races of the ball bearings 3 and 4 are thus confined between a flanged portion 29, from which a bridge or yoke 31 extends, and the head of the screw 28 when the latter is tightened. There may be used a magnetic suspension spring compensation system (not shown) of the type disclosed in British Pat. No. 722,492.

The gyroscope wheel 9 includes a ring-shaped or annular channel 32 at its periphery. The open end of the annular channel 32 faces the hysteresis motor 6 and provides an air gap region generally indicated at 33, the channel 32 being constructed of soft iron and having integrated sides or legs 34, 35 and 36 for providing a magnetic circuit, including the air gap 33. Within the air gap 33 and affixed by a conventional adhesive to the inner surface of the outer leg 34 of the annular channel 32 for rotation therewith is a ring-shaped permanent magnet 37, which magnet may be constructed as a flat cylinder of a conventional magnetic alloy such as a platinum-cobalt or other permanent magnetic alloy having similar characteristics. The magnetic material of the ring 37 is permanently magnetised in the radial direction, for example, at eight equiangularly spaced sites all of which are polarised in the same radial sense. Between adjacent poles, the magnetisation of the ring 37 falls to a low value or preferably even to zero. Thus a unidirectional magnetic field resides in the air gap 32 between the ring magnet 37 and the second or inner leg 36 of the annular channel 32, the amplitude of the field varying in a generally sinusoidal or undulating manner around the air gap 32.

Whilst eight permanently magnetised sites are provided on the permanent magnet 37, they are arranged to cooperate with four equiangularly spaced air core pick-off coils 38 (only two being seen in FIGS. 1 and 2) disposed in a cylindrical shell 39 of electrically-insulating material such as a conventional synthetic plastics composition. The coils 38 are disposed generally conformally within the cylindrical shell 39, so that they may be supported by the shell partly in the annular air gap 33. In this manner, the four air core coils 38 are mounted in the shell 39 for fixed support with respect to the housing 2, the edge of each coil being inserted into a sector of the air gap 33, between the permanent magnet 37 and the inner leg 36 of the soft iron channel 32. In view of the use of four coils 38 and of the eight permanently magnetised sites in the magnet 37, the angular length of each coil 38 along the air gap 33 is approximately equal to the angular distance between the centres of the magnetised sites in the permanent magnet 37. It will be understood that the number of magnetised sites in the magnet 37 was chosen merely by way of example, and that this number may be changed as circumstances dictate.

In FIG. 3, one pair of opposed coils 38 is arbitrarily designated as A axis coils and the coils are connected in series and poled as conventionally indicated in the drawing by dots. The centre leads 41, 42 of the respective coils 38 are directly connected via a lead 43 to a centre tap of an input winding 44, 45 of an isolation transformer 46, the transformer being poled as indicated. The outer leads 47 of the coils 38 are coupled by respective capacitors 48 to associated ends of the transformer winding 44,45. The leads 47, being respectively connected for alternating current energy differentially across the coils 38, are employed to couple an alternating signal proportional to tilt about the A axis of the gyroscope to a conventional A channel demodulator 49 for use in the conventional manner for producing a variable polarity, variable magnitude output control voltage across leads 51, 52. It will be evident to those skilled in the art that the B axis channel is constructed and operates in a similar manner, the primed numbers indicating corresponding parts, deriving differential alternating signals across the other pair of opposed coils 38 for coupling via capacitors 48' to the B channel demodulator 49'. In this manner, the alternating voltage proportional in amplitude to tilt of the gyroscope wheel 9 about the B axis is applied to the B channel demodulator 49' for producing a second variable polarity, variable amplitude control voltage appearing on leads 51', 52'.

The output windings 53, 53' of the respective transformers 46, 46' are connected in series addition, as shown in FIG. 3, to provide a phase reference alternating signal on leads 54, 55. The phase reference signal is applied to the respective A and B channel demodulators 49, 49' to serve as reference signals therein for the demodulation of the error signals on respective leads 56,57 and 56' and 57'.

For torquing the gyroscope about its A axis, a unidirectional current from a torque signal generator 58 is coupled to the leads 47. Similarly, to torque the gyroscope about its B axis, a unidirectional current from a similar conventional torque signal generator 58' is coupled to the leads 47'. Since respective capacitors 48, 48', are present, the consequent introduction of such direct current torque signals into the coils 38 has substantially no effect on the operation of the gyroscope.

In operation, the shaft 5 is driven at a frequency of 400 Hz. As the spatially modulated magnetic field around the air gap 32 passes each air core coil 38, an alternating voltage is induced in each such coil at a frequency eight times the gyroscope wheel frequency, i.e. at a frequency of 3.2 KHz. When the gyroscope wheel 9 remains at its mechanical null position with its spin axis coincident with the axis of the drive shaft 5, the alternating voltages induced in each coil are substantially equal, and the phases of the voltages in diametrically opposite coils are substantially the same. Whenever the gyroscope wheel 9 tilts with respect to the coils 38, the equality of the voltages induced in the diametrically opposed pick-off coils is disturbed. The difference in the outputs of opposed pick-off coils is, accordingly, a measure of the angular displacement of the gyroscope wheel about an input axis such as axis A, for example.

The desired pick-off output signals are obtained, as shown in FIG. 3, by connecting diametrically opposed pick-off coils 38 in series opposition. The phase reference frequency needed for demodulation of the pick-off signals is obtained by summing the outputs of all four pick-off coils 38, employing the centre-tapped transformers 46, 46' for the purpose. Other known circuits for performing the summation function may be employed. Because the average magnetic field produced by the annular permanent magnet 37 and its associated soft iron annular channel 32 in the region of each coil 38, is not zero, the passage of a controllable amplitude, unidirectional torquing current in a coil 38 produces a force parallel to the axis of the drive shaft 5 in the arcuate plane of the coil 38. By passing the direct current through diametrically opposed coils in opposite directions, a torque is exerted on the wheel 9. By employing the capacitors 48, 48', these direct currents are isolated from the transformers 46, 46', this mode of operation is entirely practical without requiring additional coils or other complicating and space-consuming components over and above those few needed merely to produce in common the tilt error signals and the phase reference voltages.

Figure 6:
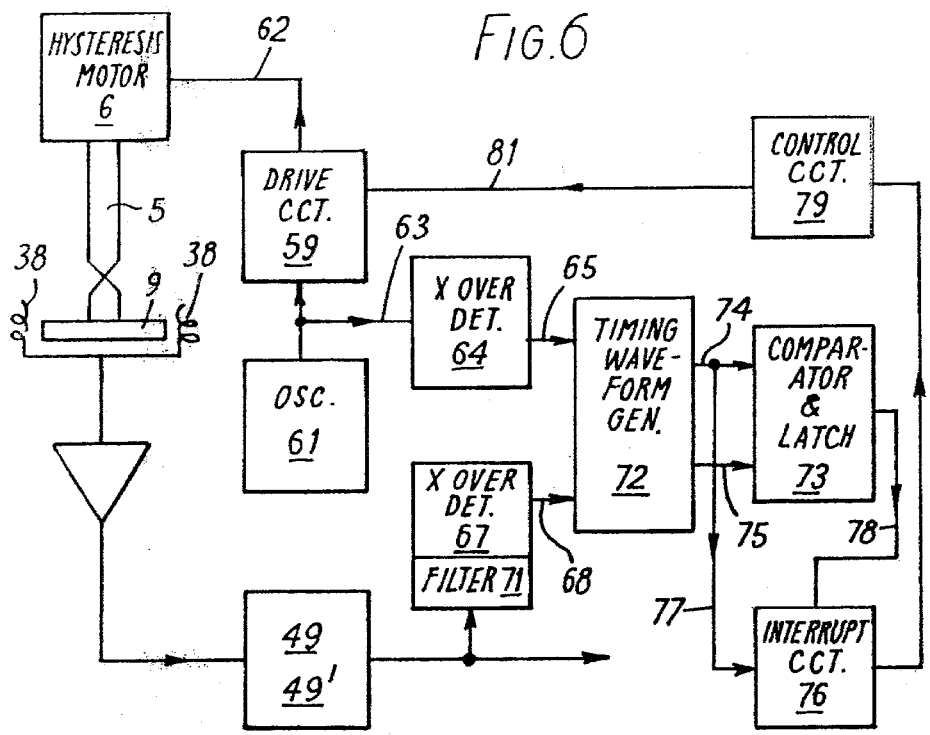
FIG. 6 is a block circuit diagram showing the main features of the present invention.

As already explained generally, the hysteresis motor 6 introduces a vibration of the shaft 5, and hence gyroscope wheel 9, which produces a steady torque on the wheel 9 in a particular direction. The gyroscope wheel 9 precesses in response to this torque causing the gyroscope to exhibit bias drift in at least one of its sensitive axes. This bias drift of the gyroscope can be compensated if constant and FIG. 6 shows the circuit which, in accordance with the present invention, maintains this bias drift substantially constant.

Figure 4:
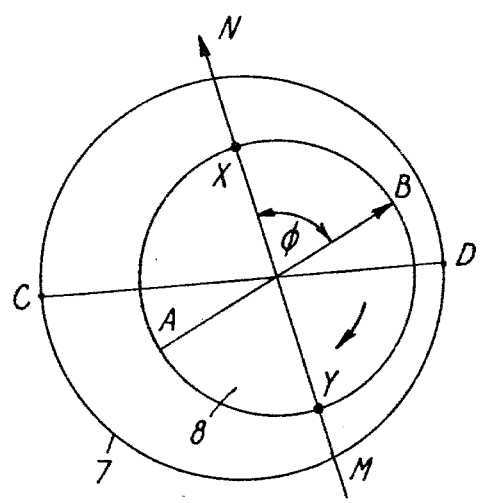
FIGS. 4 and 5 are explanatory diagrams.

Before describing this circuit in detail, however, reference will be made to the explanatory FIGS. 4 and 5. As already discussed, manufacturing and assembly tolerances inevitably give rise to some eccentricity of the motor rotor 8 with respect to the stator 7, as illustrated in FIG. 4. During normal operation of the hysteresis motor the angular relationship $\phi$ between an arbitrary pole vector $\overrightarrow{AB}$ fixed in the motor body and the axis of the rotating magnetising field $\overrightarrow{MN}$ is nominally constant but if the stator is de-energised and then re-energised, the field $\overrightarrow{MN}$ reforms at a different angle $\phi$ to the pole vector $\overrightarrow{AB}$. If a diameter CD is drawn through the point on the stator 7 that is closest to the rotor spin axis, this will remain substantially fixed with respect to the stator. When $\overrightarrow{MN}$ is parallel to CD, the attractive force F between the stator 7 and rotor 8 is at a maximum and occurs twice per rotor revolution.

Figure 5:
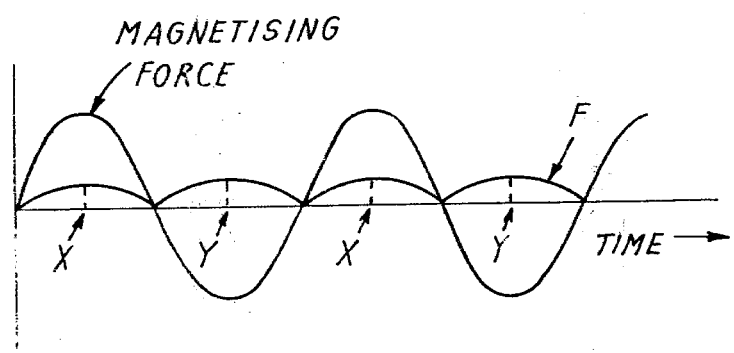

FIG. 5 illustrates the force F and magnetising field as seen on the stator 7 at the point closest to the spin axis of the rotor. The magnetising field is sinusoidal and the force F is seen as unidirectional but fluctuating, the shape of the curve shown in FIG. 5 being purely notional. It is the fluctuating or pulsating force F that creates vibration of the gyro wheel 9 resulting in bias drift of the gyroscope. The points X and Y on the rotor 8 at which the maximum force F is experienced define, with the rotor spin axis, a plane along which maximum amplitude pulsation of force F occur. A change in the angle $\phi$ shifts this plane and hence the magnitude and direction of the bias drift.

A flexure-suspended, free-rotor gyroscope emits a characteristic sinusoidal signal $V_w$ at the spin frequency of the gyroscope wheel which appears to be phase related to $\overrightarrow{AB}$, that is if the angle between $\overrightarrow{AB}$ and CD were passed through an angle-to-sine converter, the resultant sinusoid would have a constant phase relationship to $V_w$ to which is totally independent of any other changes induced by a switch-on of the gyroscope. The crux of the present invention is to use $V_w$ as an indication of where $\overrightarrow{AB}$ is with respect to $\overrightarrow{MN}$, i.e. an indication of $\phi$. Rather than measure or model $\overrightarrow{MN}$ explicitly it was decided to use, in this described embodiment, one of the sine or cosine drive signals ($V_p$) for the hysteresis motor 6, a signal that oscillates at twice the speed $V_w$. As will later be made clear, $V_w$ and $V_p$ are phase locked together so as to provide a constant angle $\phi$ and hence a bias drift of substantially constant magnitude and direction.

Figure 7:
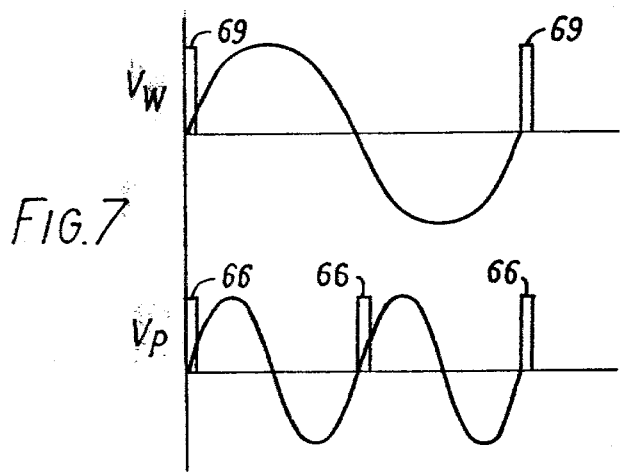
FIG. 7 illustrates certain output signals in different situations.

Referring now to FIG. 6, a drive circuit for the hysteresis motor 6 is indicated at 59 being driven by a hysteresis drive oscillator 61 and has a frequency of 800 Hz, whereby the gyroscope wheel 9 is rotated at 400 Hz. Thus the resultant pole vector established by the hysteresis motor will also have a frequency of 400 Hz but there will also be another representation of the pole vector having a frequency of 800 Hz and it is this representation ($V_p$) which is utilised, as already mentioned, in this embodiment as it is easier to detect. The drive circuit 59 has an output lead 62 connected to the stator 7 of the hysteresis motor 6 and the oscillator 61 has an output lead 63 connected to a comparator employed as a crossover detector 64 and producing on a lead 65 a pulsed output signal. The crossover detector 64 produces a pulse 66 at each positive-going crossover of the sinusoidal 800 Hz signal as shown in the lower half of FIG. 7.

As already stated, the A.C. signal induced in the coils 38 by the rotation of the wheel 9 has a frequency of 3.2 KHz but this is a raw signal in the form of a suppressed carrier, double sideband modulated signal since the fundamental frequency of 3.2 KHz is being multiplied by the 400 Hz frequency arising from the wheel rotation. Thus when the demodulators 49, 49' operate on the 3.2 KHz signal, a D.C. signal is produced on which is superimposed a 400 Hz demodulation product signal. This signal is normally considered a nuisance and has to be eliminated to give a clean output signal from the gyroscope and this is still the case. However, this 400 Hz signal is useful in the context of the present invention because one cycle thereof is generated for every revolution of the gyroscope wheel and it is found that the phase of the signal is fixed relative to the gyroscope wheel for a given gyroscope. As a result of this phenomenon, any point on the 400 Hz $V_w$ signal is exclusive to a point on the gyroscope wheel 9 itself.

In the present embodiment the point on the $V_w$ signal selected for sensing is the positive-going cross-over point and this is detected by a comparator used as a detector 67 and producing a pulsed output signal on a lead 68. The pulses are indicated at 69 in the upper half of FIG. 7. Before the D.C. signal with the superimposed 400 Hz signal is fed to the crossover detector 67, it is passed through a bandpass filter 71.

The pulsed signals on leads 65 and 68 are fed to a timing waveform generator 72 in the form of a dual monostable circuit which generates from the leading edge of each pulse 66 and 69 a narrower pulse to enable a more accurate comparison of the $V_p$, $V_w$ pulses to be made. The width of the $V_p$ and $V_w$ pulses determines the resolution of the apparatus and a resolution of 0.1 degrees has been achieved without difficulty. The narrower pulses are fed to a combined comparator and latch circuit 73 on respective leads 74 and 75 and the $V_p$ pulses are also fed to an interrupt circuit 76 on a lead 77, as is the output of the circuit 73 on a lead 78. The output from the interrupt circuit 76 is connected to a control circuit 79, the output lead 81 of which is in turn connected to the drive circuit 59.

Figure 8:
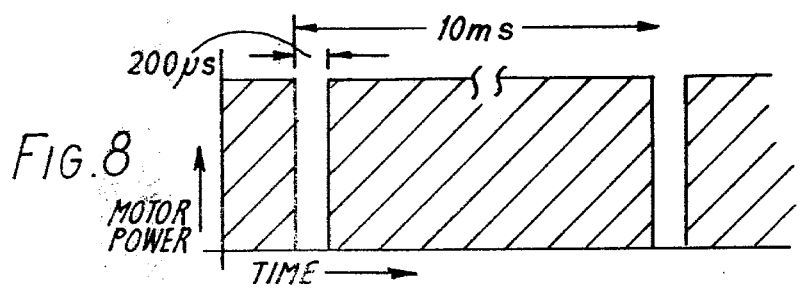
FIG. 8 illustrates a further signal waveform.

The $V_p$ pulses on lead 77 are used to trigger the interrupt circuit 76 which then interrupts, via the control circuit 79, the two-phase 800 Hz drive signal supplied by the drive circuit 59 so that the gyroscope wheel 9 will slow down and the phase of the $V_w$ pulses with respect to $V_p$ pulses will change. Either or both phases of the 800 Hz drive signal may be interrupted, preferably the latter to give better motor control. When the $V_p$ and $V_w$ are in phase, the comparator in the circuit 73 operates the latch which renders the interrupt circuit 76 inoperative so that full and continuous drive to the hysteresis motor 6 is established. It will be appreciated that the $V_p$ pulses on lead 77 trigger a periodic interruption of the hysteresis motor drive via the interrupt circuit 76 and control circuit 79, the waveform being illustrated in FIG. 8.

Since the positive-going crossover point on the 400 Hz $V_w$ signal is exclusive to a particular point on the gyroscope wheel 9, then the locking of the phase of $V_p$ to this crossover point on $V_w$ also locks the phase of $V_p$ to a particular point on the wheel. Thus the direction of the vibration introduced by the hysteresis motor 6 will remain substantially constant, with respect to the wheel 9, and hence the magnitude and direction of the associated bias drift will remain substantially constant.

With a resolution of 0.1 degrees referred to above, the bias repeatability of the gyroscope has been improved by an order of ten so that a repeatability of 0.25°/hour has been achieved with a gyroscope having a normal repeatability of 3°/hour. Thus a significant improvement is afforded by the present invention and higher orders of repeatability are likely to be achieved. Furthermore, the bias control is effected during a relatively short period after run-up of the gyroscope when the output thereof is unlikely to be used. The required bias repeatability has been achieved within ten seconds of switch on, of which the run-up period is about three seconds.

It will be apparent that there can be an electrical ambiguity in the phase locking of $V_p$ to $V_w$ with a four pole motor because the frequency of the former is twice that of the latter. However, as can be seen from FIG. 5, the force at point X on the rotor 8 will be substantially the same as that at point Y so that any discrepancy between locking $V_w$ first to point X and then to point Y will have a relatively small effect on the bias drift experienced. Thus with a four pole motor and deriving $V_P$ from the motor drive signal there is established a fixed angle $\phi$ (plus 180° or 0° according to which point X or Y is used) between $\vec{AB}$ and $\vec{MN}$, where $\vec{AB}$ is always fixed with respect to the motor rotor. This assures a very small spread of gyroscope bias drift repeatability. It will be understood that with a two pole hysteresis motor there will be no ambiguity and with a six pole motor the fixed angle will be $\phi \pm 120°$.

The sensing of the identifiable point on the gyroscope wheel 9 may be varied and, for example, a magnetic insert in the periphery of the wheel may be used rather than relying on the inherent signature of wheel as discussed above. The circuitry involved in accommodating this different identification technique would be the same as that described in relation to the drawings. The identifiable point need not be directly related to the sensitive element but merely associated therewith. For example, the identifiable point may be provided on the rotor of the hysteresis motor.

We claim:

1. An improved gyroscope of the type having a rotatable sensitive element coupled to a hysteresis motor wherein the improvement comprises:

electromagnetic means for generating a waveform wherein any point on said waveform relates to an exclusive point on said rotatable sensitive element;

means for detecting an identified point on said waveform generated by said electromagnetic means, means for detecting the position of a pole vector associated with said hysteresis motor;

comparator means responsive to said means for detecting an identified point and means for detecting the position of a pole vector to compare the phase of said pole vector with respect to said identified point and produce an output signal; and means for controlling said hysteresis motor responsive to the output signal of said comparator means, whereby the phase of said pole vector is adjusted relative to said identified point to make substantially constant the vibration on said rotatable sensitive element.

2. An improved gyroscope according to claim 1 wherein said electromagnetic means for generating a waveform includes at least one magnet affixed to said rotatable sensitive element for rotation past coil means having demodulating means coupled thereto.

3. An improved gyroscope according to claim 2 wherein the means for detecting an identified point includes a cross over detector and filtering means responsive to the output of said demodulating means.

4. An improved gyroscope according to claim 3 wherein the means for detecting the position of a pole vector includes a cross over detector.

5. An improved gyroscope according to claim 4 wherein the comparator means includes a timing waveform generator.

6. An improved gyroscope according to claim 5 wherein the comparator means further includes latching means.

7. An improved gyroscope according to claim 6 wherein the control means includes a control circuit and an interrupt circuit for selectively interrupting the drive means of said hysteresis motor.

* * * * *